C. DE L. RICE.
BELT GEARING.
APPLICATION FILED MAR. 2, 1906.
981,390.
Patented Jan. 10, 1911.
2 SHEETS—SHEET 1.
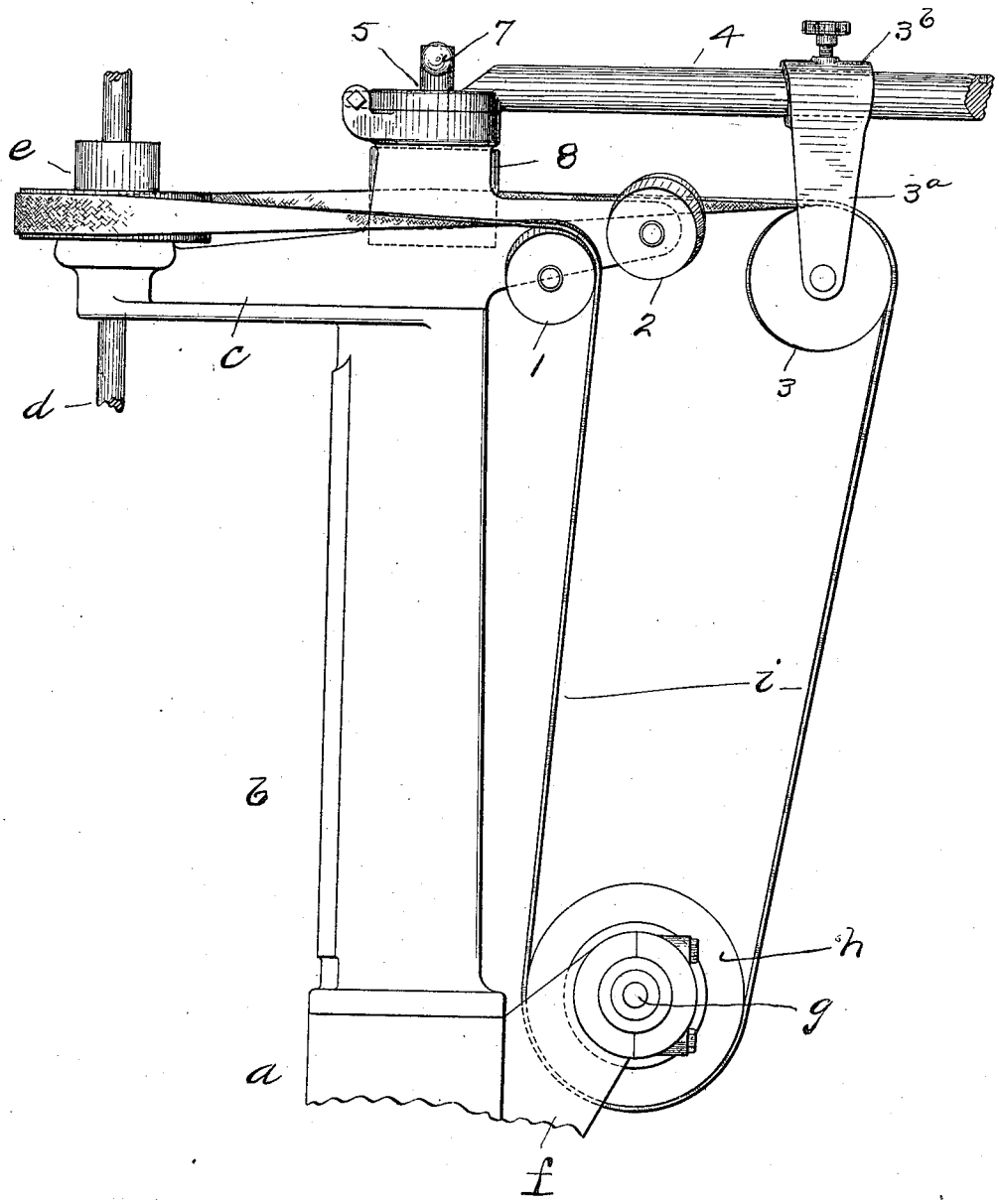

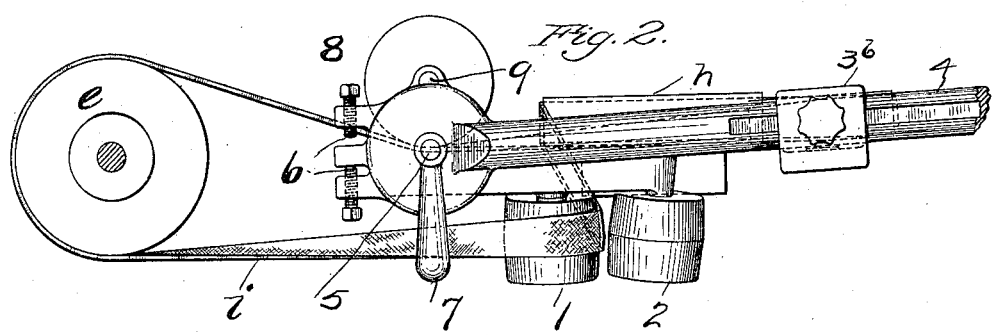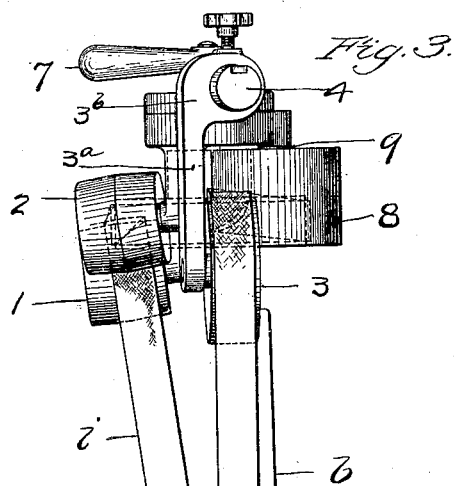

UNITED STATES PATENT OFFICE.

CHARLES DE LOS RICE, OF HARTFORD, CONNECTICUT.

BELT-GEARING.

981,390. Specification of Letters Patent. Patented Jan. 10, 1911.

Application filed March 2, 1906. Serial No. 303,908.

*To all whom it may concern:*

Be it known that I, CHARLES D. RICE, a citizen of the United States of America, residing at Hartford, in the county of Hartford and State of Connecticut, have invented certain new and useful Improvements in Belt-Gearing, of which the following is a specification.

The object of the invention is to provide a belt gearing for drill presses and like machines having features of novelty and advantage.

Figure 1 is a side elevation of a portion of a drill press in which my invention is embodied. Fig. 2 is a top view of the same. Fig. 3 is a rear view of the same.

In the drawings $a$ denotes a part of the pedestal, $b$ the upright, $c$ the overhanging arm supporting the spindle $d$ having the pulley $e$, $f$ a bracket in which the counter shaft $g$ is mounted, $h$ the counter shaft pulley fast on its shaft, $i$ the belt passing around the spindle and counter shaft pulleys and over suitable idlers 1, 2, 3. As shown the spindle and counter shaft pulleys are what are known as two-step pulleys but each shaft might well be supplied with a pair of pulleys of different diameters in place of the two-step cones; either arrangement would work equally well.

In order to deliver the belt to the spindle pulley I provide two idlers, 1, 2, arranged in different vertical planes, the idler 1 being in line with the lower step and 2 with the upper step of the spindle pulley. The axes of these idlers are squared to the line of delivery of the belt from the counter shaft pulley in order to get the proper results.

The counter shaft pulley in the case illustrated is fast to its shaft and consequently provision must be made at the idlers for taking the belt whether it be on the larger or smaller step of this counter shaft pulley. This is accomplished by making the idlers of extra width, with the central plane of their face at a distance midway between the centers of the steps of the counter shaft pulley and crowning the idlers quite sharply in order to incline the belt toward the center of the idlers. It is essential that the return idler 3 shall track with whichever step of the counter shaft pulley is in use. When the counter shaft pulley is arranged to slide on its shaft as indicated in my co-pending application S. No. 303,907 this tracking of the return idler can be taken care of. As illustrated in this case the counter shaft pulley is fast on its shaft and the return idler 3 is fixedly secured to a depending arm $3^a$ on a sleeve $3^b$ which is mounted on a rod 4 and adjustable back and forth thereon to take up slack. This rod 4 is pivotally supported as at 5 so that it can swing in a horizontal plane between the stops 6 and is provided with a clamping device operated by the handle 7 so that it can be locked in any position. The stops 6 are adjusted so that when the parts are in the position shown in Fig. 2 the return idler will track with the large step and when thrown against the other step it will track with the small step. After adjustment is made the idler is fixed in position by turning the handle 7. With this fixed condition of the return idler 3 it is necessary to deliver the belt to it from either step of the spindle pulley so that its line of travel shall be substantially at right angles to the pulley face. As seen in Fig. 2 the return idler 3 is mounted on about the center of the machine and a drum 8 mounted on a vertical axis 9 is located in such a position that the face of the return idler will square to a vertical plane tangent to the drum. In consequence as the belt leaves either step of the spindle pulley it is driven by this drum to a tracking position with the return idler. This obviates the necessity of having an adjustment of the return idler so that it will track with the steps of the spindle pulley and also has the effect of wrapping the belt more than usual about the spindle pulley, giving a better drive.

I claim as my invention:

1. In a belt gearing for drill presses and like machines the combination with the machine frame, the counter shaft and spindle, pairs of pulleys of different diameters on each, and the belt, of idlers for the delivery and return sides of said belt, said return idler being mounted on an axis substantially parallel to said counter shaft and adjustable to track with either one of the counter shaft pulleys.

2. In a belt gearing for drill presses and like machines the combination with the machine frame, the counter shaft and spindle, pairs of pulleys of different diameters on each, and the belt, of idlers for the delivery and return sides of said belt, and a support for said return idler adapted to swing in a horizontal plane to cause said idler to track with either of the counter shaft pulleys.

3. In a belt gearing for drill presses and like machines the combination with the machine frame, the counter shaft and spindle, pairs of pulleys of different diameters on each, and the belt, of idlers for the delivery and return sides of said belt, a rod on which said return idler is hung and a pivotal support therefor permitting it to swing in a horizontal plane to cause said return idler to track with either of the counter shaft pulleys.

4. In a belt gearing for drill presses and like machines the combination with the machine frame, the counter shaft and spindle, pairs of pulleys of different diameters on each, and the belt, of idlers for the delivery and return sides of said belt, a rod on which said return idler is hung and a pivotal support therefor permitting it to swing in a horizontal plane to cause said return idler to track with either of the counter shaft pulleys, and a clamping device to lock said rod in adjusted position.

5. In a belt gearing for drill presses and like machines the combination with the machine frame, the counter shaft and spindle, pairs of pulleys of different diameters on each, and the belt, of idlers for the delivery and return sides of said belt, said return idler being non-adjustable with reference to tracking with either of the spindle pulleys, and means for causing the belt as it comes from the spindle pulleys to track with said return idler, said return idler being adjustable back and forth horizontally to take up slack in the belt.

6. In a belt gearing for drill presses and like machines the combination with the machine frame, the counter shaft and spindle, pairs of pulleys of different diameters on each, and the belt, of idlers for the delivery and return sides of said belt, and means for causing the belt as it comes from either of the spindle pulleys to track with said return idler, comprising a drum mounted on a vertical axis and tangent to a vertical plane through the center of the face of said idler.

7. In a belt gearing for drill presses and like machines the combination with the machine frame, the counter shaft and spindle, pairs of pulleys of different diameters on each, and the belt, of idlers for the delivery and return sides of said belt, an arm pivotally supported to swing in a horizontal plane, said return idler fixedly secured to said arm whereby it is caused to track with either of the counter shaft pulleys, said return idler being adjustable lengthwise of said support to take up the slack in the belt, and the drum mounted on a vertical axis with the central plane of the face of said return idler substantially tangent thereto, whereby the belt coming from either of said spindle pulleys is caused to track with said return idler, substantially as described.

8. In a belt gearing for drill presses and like machines the combination with the machine frame, the counter shaft and spindle, pairs of pulleys of different diameters mounted on each, and the belt, of a pair of delivery idlers arranged in different horizontal planes, each idler being in tracking relation with one of said spindle pulleys, the axes of said idlers being substantially squared to the line of delivery of the belt from the counter shaft pulley to it, and an idler for the return side of said belt.

9. In a belt gearing for drill presses and like machines the combination with the machine frame, the counter shaft and spindle, pairs of pulleys of different diameters fixedly secured to each, and a belt, of idler pulleys for the delivery and return sides of said belt, a support adapted to swing in a horizontal plane, said return idler mounted thereon permitting it to track with either of the counter shaft pulleys, adjustable stops to determine the extent of the swinging movement of said support, and means for locking said support in its adjusted position.

10. In a belt gearing for drill presses and like machines the combination with the machine frame, the counter shaft and spindle, pairs of pulleys of different diameters on each, and the belt, of idlers for the delivery and return sides of said belt, and means interposed between the spindle pulleys and the return idler for causing the belt as it comes from either of said spindle pulleys to track with said return idler.

11. In a belt gearing for drill presses and like machines the combination with the machine frame, the counter shaft and spindle, pairs of pulleys of different diameters on each, and the belt, of idlers for the delivery and return sides of said belt, said return idler being non-adjustable as to tracking with said spindle pulleys, and out of alinement therewith, and means for causing the belt as it comes from either of the spindle pulleys to track with said return idler.

12. In a belt gearing for drill presses and like machines the combination with the machine frame, a horizontal counter shaft extending lengthwise thereof, a spindle parallel to a vertical plane through the axis of the counter shaft, a pair of pulleys of different diameters on each, and a belt, of idlers for the delivery and return sides of said belt, means for causing the belt as it comes from either spindle to track with said return idler, and a support for said return idler adjustably mounted to swing in a horizontal plane to cause said idler to track with either of the counter shaft pulleys.

13. In a belt gearing for drill presses and similar machines the combination with the machine frame, a counter shaft extending lengthwise thereof, a spindle parallel to a vertical plane through the axis of said counter shaft, a pair of pulleys of different diameters on each, and a belt, of idler pulleys for the delivery and return sides of said belt, means for causing the belt as it comes from the spindle pulley to track with said return idler, said return idler being adjustable in the direction transverse to the planes of rotation of said counter shaft pulleys whereby it may be brought into tracking relation with either one of said pulleys.

In testimony whereof I affix my signature in presence of two witnesses.

CHARLES DE LOS RICE.

Witnesses:
   W. M. Dyorkman,
   Ed. S. McAll.